(12) United States Patent
Vidal et al.

(10) Patent No.: US 9,149,155 B2
(45) Date of Patent: Oct. 6, 2015

(54) COOKING VESSEL WITH ROTARY BLADES

(75) Inventors: Josep Alet Vidal, Oliana (ES); Lluis Trench Roca, Sallent (ES)

(73) Assignee: ELECTRODOMESTICOS TAURUS, SL (ES)

( * ) Notice: Subject to any disclaimer, the term of this patent is extended or adjusted under 35 U.S.C. 154(b) by 367 days.

(21) Appl. No.: 13/635,367

(22) PCT Filed: Mar. 7, 2011

(86) PCT No.: PCT/ES2011/000063
§ 371 (c)(1),
(2), (4) Date: Nov. 6, 2012

(87) PCT Pub. No.: WO2011/113971
PCT Pub. Date: Sep. 22, 2011

(65) Prior Publication Data
US 2013/0042767 A1 Feb. 21, 2013

(30) Foreign Application Priority Data
Mar. 16, 2010 (ES) .................................. 201000345

(51) Int. Cl.
| | |
|---|---|
| *A47J 43/00* | (2006.01) |
| *B01F 13/00* | (2006.01) |
| *A47J 43/046* | (2006.01) |
| *B01F 13/08* | (2006.01) |
| *A47J 36/16* | (2006.01) |

(Continued)

(52) U.S. Cl.
CPC .............. *A47J 43/0465* (2013.01); *A47J 36/16* (2013.01); *A47J 36/32* (2013.01); *B01F 13/0827* (2013.01); *B01F 13/0845* (2013.01); *A47J 43/0722* (2013.01)

(58) Field of Classification Search
CPC ... A47J 43/0465; B01F 13/0827; B01F 13/08
USPC ............ 99/348, 422, 403; 220/574, 632, 912; 126/387.1, 390.1; 219/621, 622, 625; 366/274, 273, 146, 144, 601
See application file for complete search history.

(56) References Cited

U.S. PATENT DOCUMENTS 2,548,035 A * 4/1951 May ............................... 220/632
3,168,294 A 2/1965 Hasumura
(Continued)

FOREIGN PATENT DOCUMENTS

DE 19624648 A1 1/1998
EP 1238612 A1 11/2002
(Continued)

*Primary Examiner* — Reginald L Alexander
(74) *Attorney, Agent, or Firm* — Hess Patent Law Firm LLC; Robert J. Hess

(57) ABSTRACT

The cooking vessel (50) has a bottom (56) and rotary blade driving means (32) inside a vessel wall (51), and is suitable for working on a support plate (2) of a cooking hob (1) having rotary blade driving means (32) to rotate a lower magnetic coupling member (5). The vessel includes an upper magnetic coupling member (54) connected to the blades (53) and arranged close to an upper surface of said support plate (2) when the vessel (50) is on the plate. The vessel comprises a support element (55) below said bottom (56) of the vessel (51) for resting on the support plate (2), said support element (55) having a coefficient of friction with respect to the support plate (2) low enough to allow the sliding and self-centering of the cooking vessel (50) due to the effect of said lower magnetic coupling member (5).

19 Claims, 3 Drawing Sheets

(51) Int. Cl.
*A47J 36/32* (2006.01)
*A47J 43/07* (2006.01)

(56) References Cited

U.S. PATENT DOCUMENTS

| | | | |
|---|---|---|---|
| 5,549,382 A | | 8/1996 | Correia, II et al. |
| 5,806,410 A | * | 9/1998 | Muchin et al. ................. 99/422 |
| 5,834,739 A | | 11/1998 | Lockwood et al. |
| 5,860,559 A | * | 1/1999 | Wang ........................... 220/737 |
| 6,076,957 A | * | 6/2000 | Gomes .......................... 366/274 |
| 6,095,677 A | * | 8/2000 | Karkos et al. ................. 366/274 |
| 7,018,091 B2 | * | 3/2006 | Arroubi et al. ................ 366/199 |
| 7,687,941 B2 | * | 3/2010 | Raghuprasad ................ 307/151 |
| 7,784,638 B2 | * | 8/2010 | Kishbaugh et al. ........ 220/573.3 |
| 2006/0146645 A1 | * | 7/2006 | Rosener ........................ 366/274 |

FOREIGN PATENT DOCUMENTS

| | | |
|---|---|---|
| JP | 59073034 A | 4/1984 |
| JP | 2005296423 A | 10/2005 |
| WO | 02096761 A2 | 12/2002 |
| WO | 2005110587 A2 | 11/2005 |

\* cited by examiner

COOKING VESSEL WITH ROTARY BLADES

FIELD OF THE ART

The present invention relates to a cooking vessel provided therein with rotary blades and suitable for working with a cooking hob provided with a continuous glass or glass ceramic support plate and with driving means for driving the rotary blades of the cooking vessel through the support plate by means of a magnetic coupling.

BACKGROUND OF THE INVENTION

Document DE-A-1131372 discloses a cooking vessel having rotary blades installed therein. The rotary blades are fixed to a vertical shaft which is passed through an opening to the bottom of the vessel and fixed to an upper magnetic coupling member arranged in a hollow formed at the bottom. The cooking vessel is suitable for working with a cooking hob having a support plate and a lower magnetic coupling member driven by a motor for rotating below the support plate in a position close to a lower surface thereof. When the cooking vessel is placed on the support plate of the cooking hob, the mentioned upper magnetic coupling member faces the support plate and is very close to an upper surface thereof, such that the lower magnetic coupling member is capable of magnetically transmitting torque imparted by the motor to the upper magnetic coupling member to rotate the rotary blades inside the cooking vessel.

One drawback is that in the event that the rotary blades are locked, for example by food contained in the vessel, the vessel would tend to rotate around on the hob due to the effect of the torque transmitted by said magnetic couplings, which would entail a risk of accident.

Given that the support plate is smooth and continuous it is only possible to place the cooking vessel approximately on a treatment area of the support plate below which the lower magnetic coupling member is located, such that the shafts of the lower and upper magnetic coupling members are generally off-center. This entails another drawback since the off-centering of the rotating shaft of the upper magnetic coupling member may lead to a malfunction of the rotary blades.

If the coefficient of friction between the outer surface of the metal bottom of the vessel and the upper surface of the support plate is low enough, the cooking vessel will tend to slide on the support plate until it centers itself in relation to the rotating shaft of the lower magnetic coupling member due to the effect of the torque transmitted by the lower magnetic coupling member to the upper magnetic coupling member when the drive motor is activated. Nevertheless, this entails yet another drawback since this self-centering sliding of the cooking vessel on the support plate, if it occurs, may cause screeching, may scratch the support plate and degrade the upper surface thereof in the treatment area in a long run.

DISCLOSURE OF THE INVENTION

The present invention contributes to overcoming the aforementioned and other drawbacks by providing a cooking vessel with rotary blades suitable for working with a cooking hob provided with a continuous glass or glass ceramic support plate with a treatment area and rotary blade driving means including a lower magnetic coupling member rotatably installed below said support plate in said treatment area.

The cooking vessel comprises a vessel wall with a bottom and an upper opening, rotary blades installed inside said vessel wall, an upper magnetic coupling member connected to said rotary blades and arranged facing and at a short distance from an upper surface of said support plate when said cooking vessel is located thereon, and a support element located at a lower level than said bottom of the vessel wall for resting on the support plate, such that the bottom of the cooking vessel is very close to the upper surface of the support plate without contacting same.

The mentioned support element is made of a material having a coefficient of friction with respect to the support plate low enough to allow sliding and self-centering of the cooking vessel in the treatment area of the support plate due to the effect of torque transmitted magnetically by said lower magnetic coupling member of the cooking hob to said upper magnetic coupling member of the cooking vessel through the support plate, and high enough to prevent the cooking vessel from rotating on the support plate due to the effect of said torque, for example in the event that the rotary blades are unintentionally locked inside the vessel. Furthermore, the material from which the support element is made is soft enough so as to not scratch the support plate and resistant enough to high temperatures to withstand the temperatures derived from a cooking process.

With this arrangement, the cooking vessel can only be approximately placed on the treatment area of the support plate without needing to center it perfectly since the cooking vessel will center itself quietly and without scratching the support plate when the rotary blade driving means of the cooking hob start operating.

A silicone-based elastomer material capable of supporting relatively high temperatures is suitable for the support element. In one embodiment, the support element is in the form of a perimetral ring housed for example in a support skirt fixed to the vessel wall or fixed directly at the bottom of the vessel, although it could alternatively be in the form of three or more individual support chocks, or the cooking vessel could have three or more individual legs, each finished with a support element.

In one embodiment, the bottom of the cooking vessel comprises a planar portion around the upper magnetic coupling member and this planar portion comprises a ferromagnetic layer suitable for being heated through induction by a heating device arranged below the support plate around said lower magnetic coupling member of the cooking hob.

The cooking vessel preferably comprises a lid for closing said upper opening and a lid position detector configured and arranged for detecting if said lid is in a closed position. This lid position detector can comprise, for example, a reed switch provided to be activated by the magnetic field generated by a permanent magnet housed in a strategic position of the lid. The lid position detector is in connection with an electronic circuit which includes a signal emitter configured for wirelessly emitting a signal representative of said lid position detection.

Said emitted signal is suitable for being received by a signal receiver located below the support plate. For example, the mentioned receiver can be in connection with a control circuit configured for enabling or disabling the operation of said rotary blade driving means and/or said induction heating means of the cooking hob according to said emitted signal.

The cooking vessel optionally comprises a temperature detector configured and arranged for detecting a temperature in the vessel, for example the temperature of the vessel wall. Said temperature detector is also in connection with said electronic circuit, and said signal emitter is configured for wirelessly emitting a signal representative of said temperature detection, said signal being suitable for being received by the signal receiver located below the support plate to cooperate in the control of said induction heating device of the cooking hob and/or the control of the rotary blade driving means.

In one embodiment, the cooking vessel comprises a photovoltaic cell exposed to light housed for example in a recess of a handle of the vessel and protected by a transparent cover. This photovoltaic cell is connected for charging an energy storage device, such as a rechargeable battery or an ultracapacitor, for example, which is configured and arranged for supplying electric current to said electronic circuit and to said detectors. In another alternative embodiment, the cooking vessel comprises an energy receiver configured and arranged for receiving energy wirelessly emitted by an energy emitter installed below the support plate and for converting said received energy into electric current that will be supplied to the electronic circuit and to the detectors.

According to one embodiment, the mentioned handle is fixed to the vessel wall by means of a fixing portion defining a housing wherein the electronic circuit, the lid position detector, the temperature detector, the signal emitter, and the energy storage device are housed.

Additionally, the electronic circuit of the cooking vessel in any of its possible embodiments can have stored information relating to the vessel, for example, vessel type, dimensions, temperature sensor calibration, manufacturer, year of manufacture, etc., and this information package can be transmitted together with the remaining information through an emitter of the cooking vessel when it is placed on the support plate. Therefore, the receiver of the cooking hob can receive the mentioned information and the control circuit can control several functions of the cooking hob according to the information received.

BRIEF DESCRIPTION OF THE DRAWINGS

The foregoing and other features and advantages of the invention will be better understood from the following detailed description of one embodiment with reference to the attached drawings, in which.

DETAILED DESCRIPTION OF EXEMPLARY EMBODIMENTS

Figure 1:
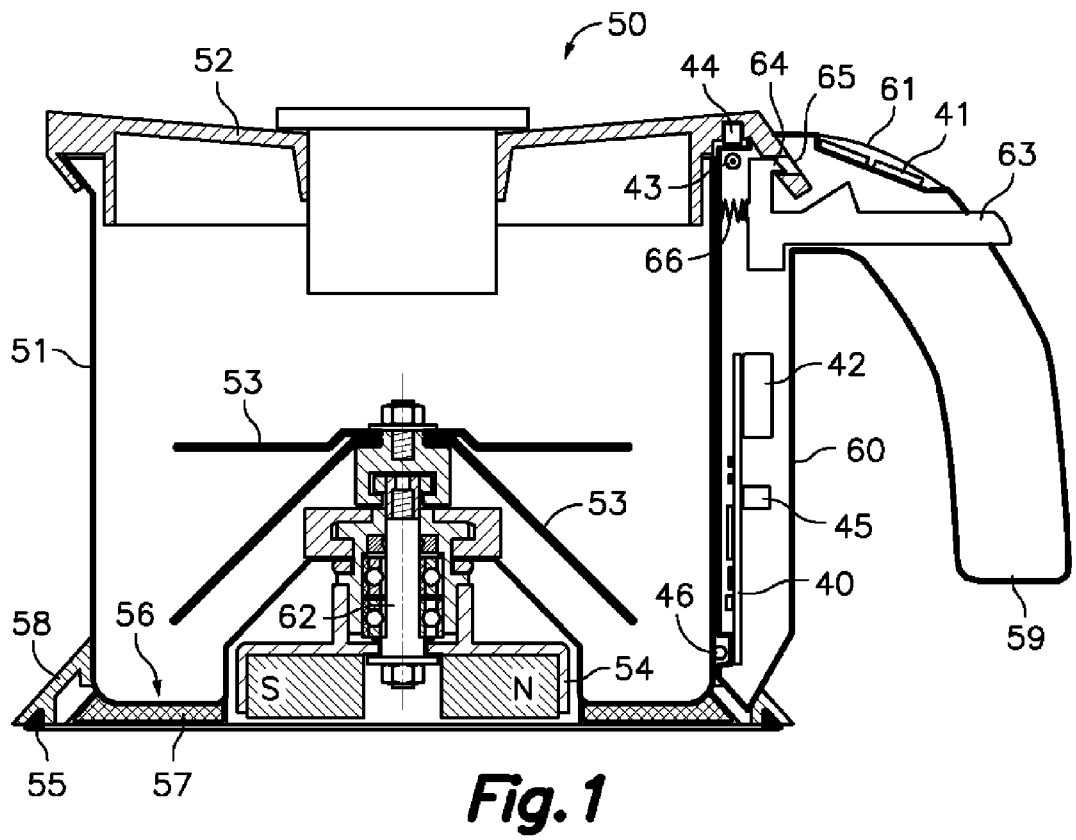
FIG. 1 is a schematic elevational cross-section view of a cooking vessel with rotary blades according to an embodiment of the present invention.

Referring first to FIG. 1, a cooking vessel 50 according to an embodiment of the present invention is shown therein. The cooking vessel 50 comprises a vessel wall 51 with a bottom 56 and an upper opening. A lid 52 is provided for closing said upper opening and a handle 59 is provided for handling the vessel, which handle 59 is fixed to said vessel wall 51 by means of a fixing portion 60. Rotary blades 53 which are supported to rotate with respect to a vertical shaft 62 passing through an opening at said bottom 56 and connected with an upper magnetic coupling member 54 arranged in an open-bottom concavity formed at the bottom 56 are installed inside the vessel wall 51. Said opening at the bottom 56 through which the vertical shaft 62 passes is conveniently sealed, for example by means of a seal.

The bottom 56 of the cooking vessel 50 comprises a planar portion around the cavity where the upper magnetic coupling member 54 is located and said planar portion includes a ferromagnetic layer 57 suitable for being heated by an induction heating device 3. The cooking vessel 50 comprises a support element 55 located at a lower level than the bottom 56 of the vessel wall 51 for resting for example on a support plate 2 of a cooking hob (see FIGS. 3 and 4), such that the bottom 56 of the cooking vessel 50 is very close to the upper surface of the support plate 2 without contacting same (see the enlarged detail of FIG. 3). When the cooking vessel 50 is placed on the support plate 2, the mentioned upper magnetic coupling member 54 faces and is at a short distance from an upper surface of the support plate 2 without contacting same.

In the illustrated embodiment, the mentioned support element 55 is in the form of a perimetral ring housed in a support skirt 58 fixed to the vessel wall 51, although it may alternatively be in other forms. In any case, the support element 55 is made of a material having a coefficient of friction with respect to the support plate 2 low enough to allow the sliding of the cooking vessel 50 on said treatment area 4 due to the effect of said torque transmitted by the lower magnetic coupling member 5 of the cooking hob 1 to said upper magnetic coupling member 54, and high enough to prevent the cooking vessel 50 from rotating around on the support plate 2 due to the effect of the torque, for example in the event that the rotary blades 53 are locked by food contained in the vessel. The material of the support element 55 is also soft enough so as to not scratch the support plate 2. In one embodiment, the support element is made of a silicone-based elastomer material capable of withstanding the relatively high temperatures typical of a cooking process.

The cooking vessel 50 of the present invention is especially suitable for working with a cooking hob 1 (shown in FIGS. 3 and 4) provided with rotary blade driving means 32 for driving the rotary blades 53 of the cooking vessel 50. In the example shown, the cooking hob 1 comprises a base structure 11 supporting a continuous glass or glass ceramic support plate 2, which is provided with a treatment area 4 generally visually indicated on an upper surface of the support plate 2. The mentioned rotary blade driving means 32 comprise a lower magnetic coupling member 5 arranged for rotating about a vertical shaft 16 centrally arranged with respect to said treatment area 4 below the support plate 2, and a drive motor 6 operatively connected for rotating said lower magnetic coupling member 5.

The cooking hob 1 further comprises heating means 34 located in relation to said treatment area 4 below said support plate 2. In the illustrated example, said heating means 34 comprise an induction heating device 3 in the form of a planar ring arranged around the lower magnetic coupling member 5 in a position adjacent to the support plate 2 but without contacting same. An electronic induction circuit 36 supplied by an electrical connection to the mains 37 is arranged for powering up said induction heating device 3.

When the cooking vessel 50 is placed on the treatment area 4 of the support plate 2 of the cooking hob 1, the planar portion of the bottom 56 of the cooking vessel 50 faces the heating means 34 of the cooking hob 1 and the upper magnetic coupling member 54 of the cooking vessel 50 faces the lower magnetic coupling member 5 of the rotary blade driving means 32 of the cooking hob 1. Therefore, the activation of the heating means 34 allows heating the cooking vessel 50 by means of the ferromagnetic layer 57 of the bottom 56, and the activation of the drive motor 6 of the rotary blade driving means 32 allows rotating the rotary blades 53 of the cooking vessel 50 by means of the magnetic coupling of the lower and upper magnetic coupling members 5, 54 through the support plate 2.

The cooking hob 1 depicted further includes position changing means 33 for moving the lower magnetic coupling member 5 between an operative position (FIG. 3), in which the lower magnetic coupling member 5 is close enough to the support plate 2 to magnetically transmit torque to the upper magnetic coupling member 54 connected to the rotary blades 53 installed in the cooking vessel 50 located on the treatment area 4 of the support plate 2, and an inoperative position (FIG. 4), in which the lower magnetic coupling member 5 is far enough from the support plate 2 so as to not transmit said torque.

In the illustrated embodiment, a moving support 10, which can be moved vertically with respect to the base structure 11 by said position changing means 33, is arranged inside the base structure 11. The vertical shaft 16, with respect to which the lower magnetic coupling member 5 rotates, is rotatably supported on the moving support 10. The lower magnetic coupling member 5 has a cog pulley 9 fixed to it, which pulley 9 is kinetically connected by means of a cog belt 8 with a cog pulley 7 fixed to the output shaft of the drive motor 6, which is likewise supported on the moving support 10. The activation of the drive motor 6 rotates the lower magnetic coupling member 5 with respect to the vertical shaft 16.

The position changing means 33 comprise spindles 12 rotatably supported on the base structure 11. The mentioned spindles 12 are coupled to corresponding nuts 13 fixed in housings formed in the moving support 10. Each of the spindles 12 has a cog pulley 17 fixed to it. A cog belt 18 is installed on said cog pulleys 17 forcing the spindles 12 to rotate in unison. One of the spindles 12 further has a gear wheel 19 fixed to it which meshes with a worm screw 20 fixed to the output shaft of a movement motor 14 supported on the base structure 11.

Figure 3:
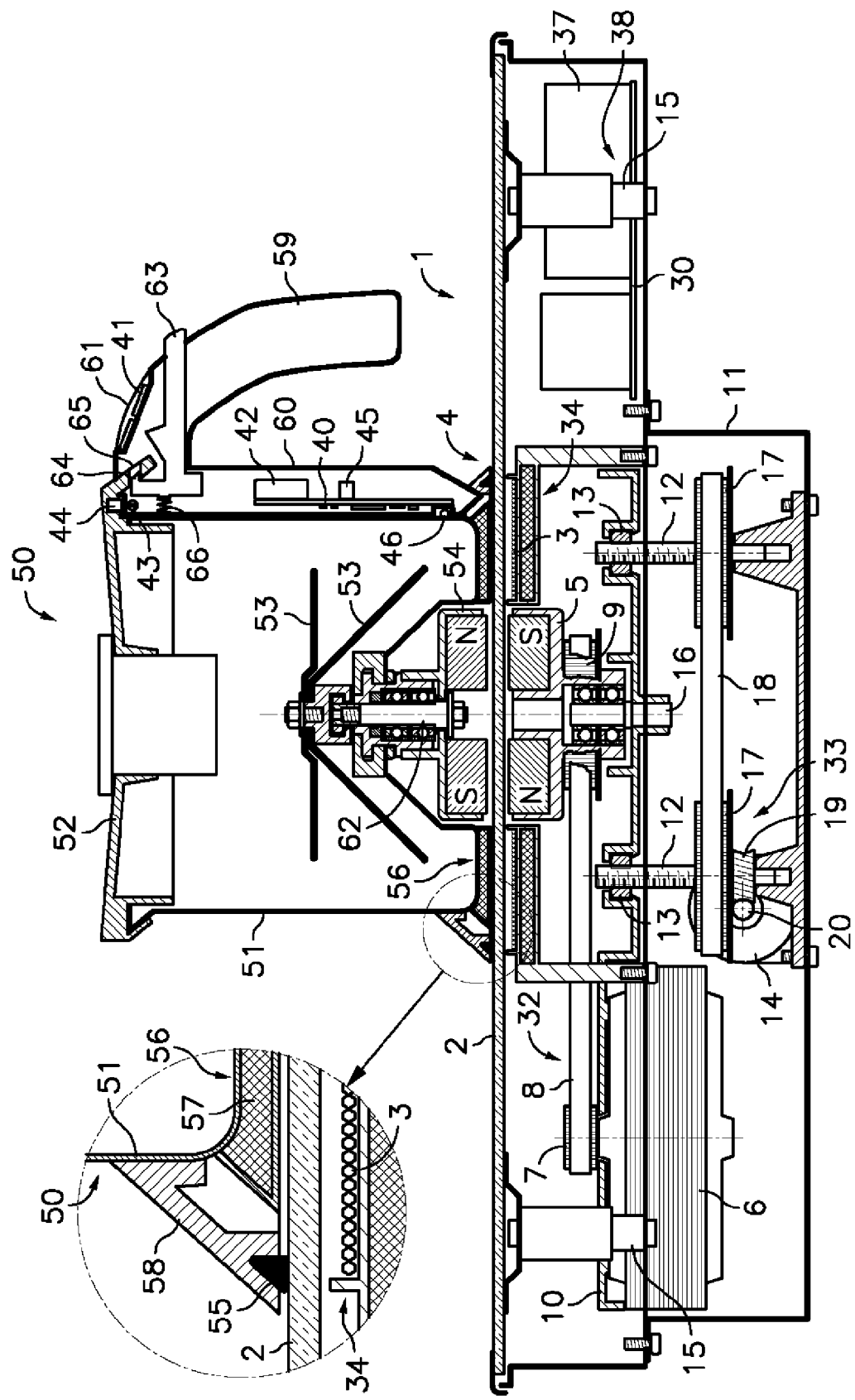
FIG. 3 is a schematic, elevational, cross-section view of the cooking vessel placed on the hob with the rotary blade driving means in an operative position with an enlarged detail.
Figure 4:
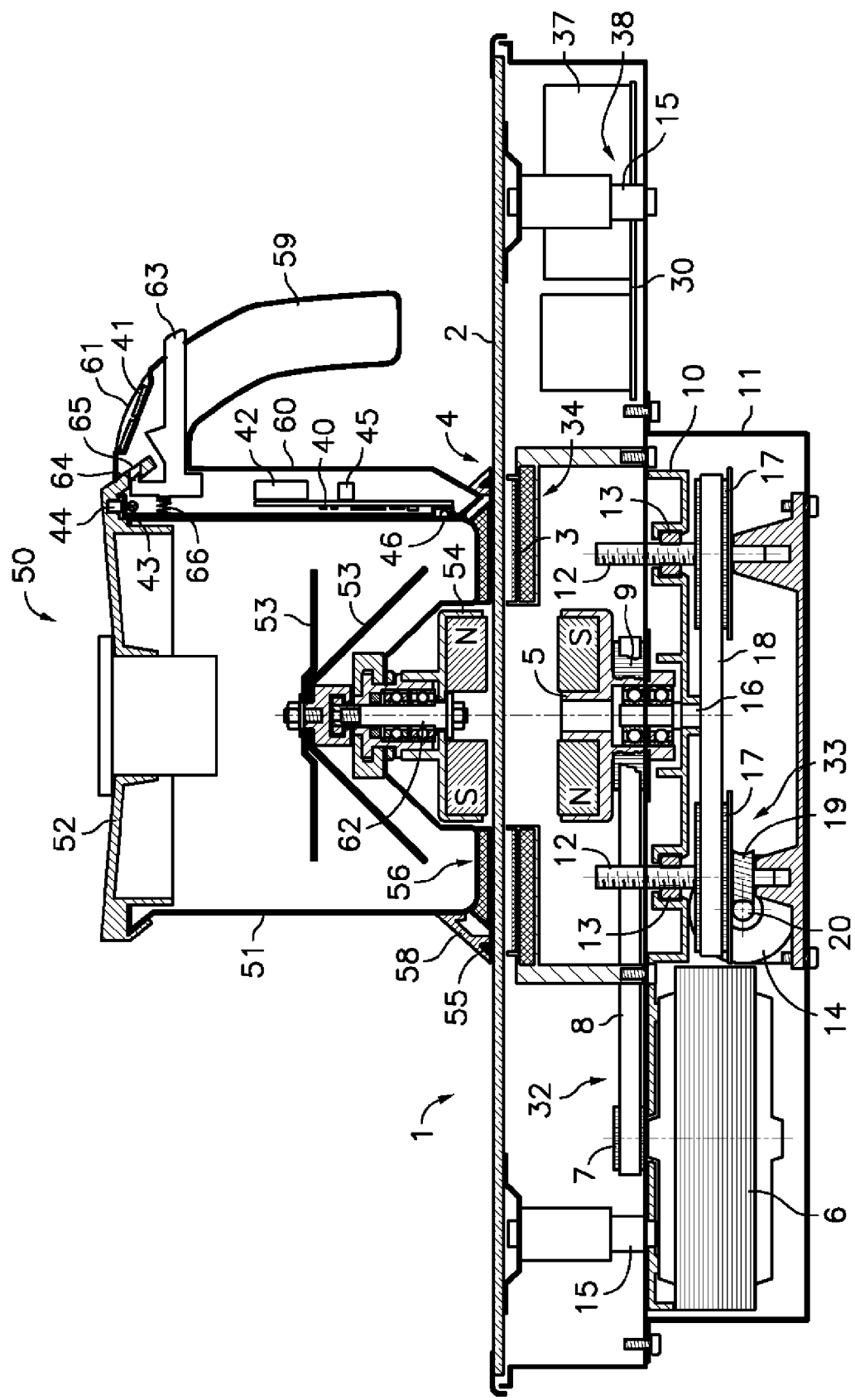
FIG. 4 is a schematic, elevational, cross-section view of the cooking vessel placed on the hob with the rotary blade driving means in an inoperative position.

Activation of the movement motor 14 for rotating in a first direction rotates the spindles 12 in a first direction, and this causes an upward vertical movement of the moving support 10 from the inoperative position shown in FIG. 4 to the operative position shown in FIG. 3. Inversely, activation of the movement motor 14 for rotating in a second opposite direction causes a downward vertical movement of the moving support 10 from the operative position shown in FIG. 3 to the inoperative position shown in FIG. 4.

There are other alternative means for activating/deactivating the magnetic coupling between the lower magnetic coupling member 5 of the cooking hob 1 and the upper magnetic coupling member 54 of the cooking vessel 50 different from the mentioned position changing means 33. For example, in one alternative embodiment which is not shown, the lower magnetic coupling member 5 is installed at a fixed distance with respect to the support plate 2, leaving a small tight space between both that is enough for accommodating one or more moving shield elements. A shielding motor is operatively connected for moving said one or more shield elements parallel to the support plate outside said space, towards an inactive position, and inside the space, towards an active position interposed between the support plate and the lower magnetic coupling member. The one or more shield elements are made of a ferromagnetic material with a high magnetic permeability, such as soft iron for example, and act as a shield deactivating the magnetic coupling.

In any case, when the lower magnetic coupling member 5 is in an inoperative situation, the cooking vessel 50 can be placed approximately on the treatment area 4 of the support plate 2 without any negative effect relating to the magnetic coupling. Once the cooking vessel 50 is placed approximately on the treatment area 4 of the support plate 2, the lower magnetic coupling member 5 is put in the operative situation and the drive motor 6 starts operating. Then, the magnetic attraction of the magnetic coupling and the torque transmitted by the lower magnetic coupling member 5 of the cooking hob 1 to the upper magnetic coupling member 54 produce the effect of attracting the cooking vessel 50, sliding it on the support plate 2 towards the center of the treatment area 4, until the rotating shaft of the upper magnetic coupling member 54 is aligned with the rotating shaft of the lower magnetic coupling member 5. The support element 55 facilitates the sliding and the self-centering of the cooking vessel 50 on the support plate 2 without scratching it.

A pushbutton 63 movable between a locking position, in which a protrusion 64 formed in the pushbutton 63 is introduced in a hole 65 formed in an appendage of the lid 52 for locking the lid 52 in the closed position, and a release position, in which the protrusion 64 is outside the hole 65 allowing the lid 52 to be opened, is installed in the handle 59 of the cooking vessel 50. An elastic element 66, such as a spring, pushes the pushbutton 63 towards said locking position, and the pushbutton 63 can be moved manually towards the release position against the elastic force of the elastic element 66.

Figure 2:
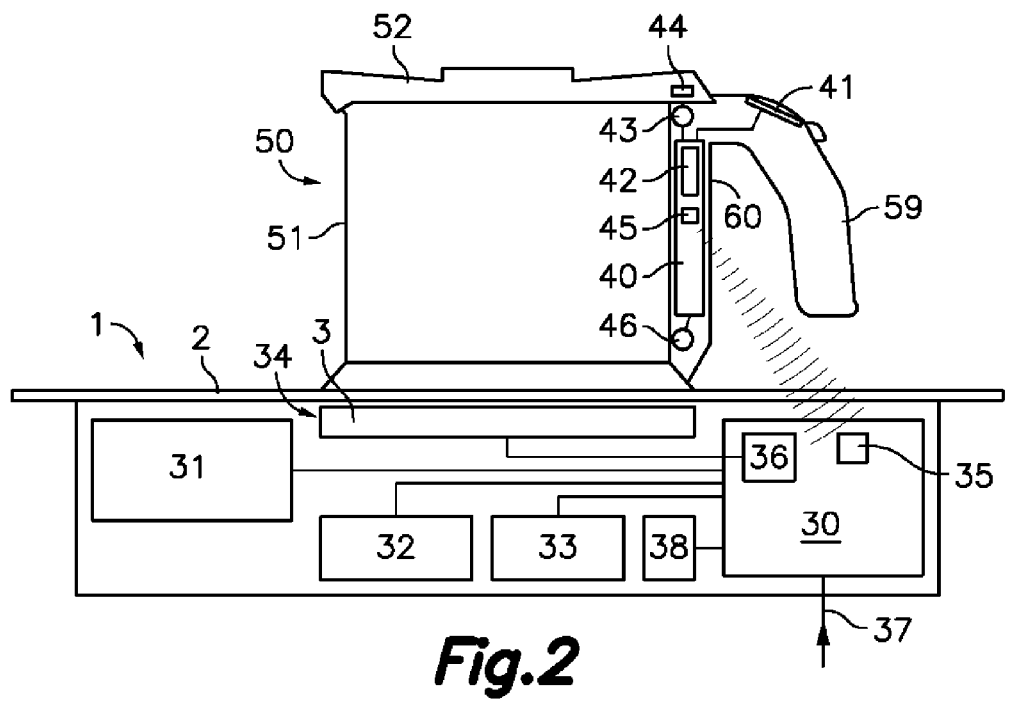
FIG. 2 is a schematic depiction of the cooking vessel of FIG. 1 in cooperation with control means of a cooking hob including rotary blade driving means.

FIG. 2 schematically depicts a wireless information emitting device included in the cooking vessel 50 for cooperating in the control of different functions of the cooking hob 1.

The mentioned fixing portion 60 of the handle 59 has a hollow interior inside which is housed an electronic circuit 40. This electronic circuit 40 is in connection with a lid position detector 43 configured and arranged for detecting if said lid 52 is in a closed position. In the illustrated embodiment, the mentioned lid position detector 43 comprises a reed switch arranged for being activated by a magnetic field generated by a permanent magnet 44 housed in the lid 52. Optionally, the electronic circuit 40 is also in connection with a temperature detector 46 configured and arranged for detecting a temperature in the vessel, for example a temperature in a region of the vessel wall 51. The electronic circuit 40 includes a signal emitter 45 configured for wirelessly emitting a signal representative of said lid position detection and/or of said temperature detection.

An electronic supply and control circuit 30 which includes a signal receiver 35 configured and arranged for receiving said signal sent from the signal emitter 45 installed in the cooking vessel 50 through the support plate 2 is arranged in the cooking hob 1. The electronic supply and control circuit 30 is configured for enabling or disabling the operation of the rotary blade driving means 32, and/or of the position changing means 33 or of the shielding means, and/or of the heating means 34 according to the signal received from said signal emitter 45.

For example, the electronic supply and control circuit 30 will not allow the rotary blade driving means 32 to start operating to rotate the lower magnetic coupling member 5 or the position changing means 33 or the shielding means to put the lower magnetic coupling member 5 in the operative situation if the signal receiver 35 has not received a signal representative of the lid 52 being correctly closed in the cooking vessel 50, even though the user has given the order to start operating by means of a control panel 31 of the cooking hob 1.

In the illustrated embodiment, the cooking vessel 50 comprises a photovoltaic cell 41 exposed to light and connected for charging an energy storage device 42, such as a rechargeable battery or an ultracapacitor, for example, configured and arranged for supplying electric current to said electronic circuit 40 and to said detectors 43, 46. For example, the photovoltaic cell 41 is housed in a recess of the handle 59 and protected by a transparent cover 61.

In another alternative embodiment (not shown), the cooking vessel 50 comprises an energy receiver configured and arranged for receiving energy wirelessly emitted by an energy emitter installed below the support plate 2 of the cooking hob 1. The mentioned energy receiver is prepared for converting said received energy into electric current and for supplying said electric current to said electronic circuit 40 and to said detectors 43, 46.

In one embodiment, the electronic circuit 40 of the cooking vessel 50 has stored information relating to the vessel, such as the vessel type, dimensions, temperature sensor calibration, manufacturer, year of manufacture, etc., and the signal emitter 45 or other emitting means in connection with the electronic circuit 40 are configured for wirelessly emitting a signal representative of this information package together with the remaining information when the cooking vessel 50 is placed on the treatment area 4 of the support plate 2.

Returning to FIGS. 3 and 4, the support plate 2 of the cooking hob 1 is supported on the base structure 11 by weighing means 38, which preferably include one or more weight transducers, each formed by a deformable support 15 and a strain gage (not shown) associated therewith. The weight transducers are in connection with the electronic supply and control circuit 30 of the cooking hob 1 for weighing the cooking vessel 50 placed on the support plate 2. Given that the tare of the cooking vessel 50 is known, for example from the information received from the cooking vessel 50, the electronic supply and control circuit 30 can directly provide the weight of the foods contained in the cooking vessel 50.

A person skilled in that art will envisage modifications and variations from the embodiments shown and described without departing from the scope of the present invention as it is defined in the attached claims.

The invention claimed is:

1. A cooking vessel comprising:
   a vessel wall having a bottom and an upper opening;
   rotary blades installed inside said vessel wall;
   an upper magnetic coupling member connected to said rotary blades and arranged for facing and being located a short distance from an upper surface of a support plate when said cooking vessel is located on said support plate;
   a support element attached to the vessel wall and located at a lower level than said bottom for resting on the support plate, said support element being made of an elastomer material;
   a lid for closing said upper opening; and
   an electronic circuit in connection with a lid position detector configured and arranged for detecting if said lid is in a closed position and with a temperature detector configured and arranged for detecting a temperature in the cooking vessel, said electronic circuit including a signal emitter configured for wirelessly emitting a signal representative of the closed position of the lid as detected by said lid position detector and a signal representative of said temperature as detected by said temperature detector.

2. The cooking vessel according to claim 1, wherein said electronic circuit has stored information relating to the cooking vessel, and the signal emitter is configured for wirelessly emitting a signal representative of said information.

3. The cooking vessel according to claim 1, wherein the support element is made of a silicone based elastomer material.

4. The cooking vessel according to claim 1, wherein the support element has the form of a perimetric ring.

5. The cooking vessel according to claim 1, wherein said bottom comprises a planar portion located around the upper magnetic coupling member, wherein said planar portion is heatable, and said material which the support element is made of supports high temperatures derived from a food cooking process.

6. The cooking vessel according to claim 5, wherein said planar portion of the bottom comprises a ferromagnetic layer which is heatable by induction.

7. The cooking vessel according to claim 1, further comprising a photovoltaic cell exposed to light and connected for charging an energy storage device configured and arranged for supplying electric current to said electronic circuit and to said lid position detector.

8. The cooking vessel according to claim 7, wherein said energy storage device comprises a rechargeable battery.

9. The cooking vessel according to claim 7, wherein said energy storage device comprises an ultracapacitor.

10. The cooking vessel according to claim 1, further comprising a handle fixed to the vessel wall by means of a fixing portion defining a housing, wherein at least said electronic circuit, said lid position detector, and an energy storage device are housed in said fixing portion of said handle, said energy storage device being configured and arranged for supplying electric current to said electronic circuit and to said lid position detector.

11. The cooking vessel according to claim 10, wherein a photovoltaic cell is housed in a recess of said handle and protected by a transparent cover, said photovoltaic cell being connected for charging said energy storage device.

12. A cooking system, comprising a cooking hob and a cooking vessel, wherein said cooking hob comprises a continuous glass or glass ceramic support plate and rotary blade driving means including a lower magnetic coupling member rotatably installed below said support plate, and wherein said cooking vessel comprises:
   a vessel wall with a bottom and an upper opening;
   rotary blades installed inside said vessel wall;
   an upper magnetic coupling member connected to said rotary blades and arranged for facing and being located a short distance from an upper surface of said support plate when said cooking vessel is located on the support plate so that said lower magnetic coupling member of the cooking hob magnetically transmits a torque to the upper magnetic coupling member;
   a support element located at a lower level than said bottom of the vessel wall for resting on said support plate of the cooking hob, said support element being made of a silicone-based elastomer material having a coefficient of friction with respect to the support plate which allows sliding and self-centering of the cooking vessel due to the effect of torque;
   a lid for closing said upper opening; and
   an electronic circuit in connection with a lid position detector configured and arranged for detecting if said lid is in a closed position, said electronic circuit including a signal emitter configured for wirelessly emitting a signal representative of the closed position of the lid as detected by said lid position detector, said signal being suitable for being received by a signal receiver included in an electronic supply and control circuit located below the support plate and configured for enabling or disabling the operation of said rotary blade driving means of the cooking hob according to said signal representative of the closed position of the lid.

13. The cooking system according to claim 12, wherein material which the support element is made of a has a coefficient of friction with respect to the support plate which prevents the cooking vessel from rotating around in the event that the rotary blades are locked.

14. The cooking system according to claim 12, wherein material which the support element is made of is softer than the support plate so as to not scratch the support plate.

15. The cooking system according to claim 12, wherein the support element and has a form of a perimetric ring.

16. The cooking system according to claim 12, wherein the cooking hob comprises heating means arranged below the support plate around said lower magnetic coupling member, said bottom of the cooking vessel comprises a planar portion around the upper magnetic coupling member suitable for being heated by said heating means, and material which the support element is made of is suitable for supporting high temperatures derived from a food cooking process.

17. The cooking system according to claim 16, wherein the cooking vessel has a temperature detector configured and arranged for detecting a temperature in the cooking vessel, said temperature detector is in connection with said electronic circuit, said signal emitter is configured for wirelessly emitting a signal representative of said temperature as detected by the temperature detector, said signal being suitable for being received by said signal receiver and said electronic supply and control circuit of the cooking hob is configured for controlling said rotary blade driving means and/or said heating means of the cooking hob on the basis of said signal representative of the temperature.

18. The cooking system according to claim 12, wherein said electronic circuit of the cooking vessel has stored information relating to the vessel and means for wirelessly emitting a signal representative of said information, said signal being suitable for being received by said signal receiver, and said electronic supply and control circuit of the cooking hob is configured for controlling one or more functions of the cooking hob on the basis of said signal representative of said information.

19. The cooking system according to claim 12, wherein the cooking vessel comprises an energy receiver configured and arranged for receiving energy wirelessly emitted by an energy emitter installed below the support plate of the cooking hob, for converting said received energy into electric current and for supplying said electric current to said electronic circuit and to said lid position detector.

* * * * *